(12) United States Patent
Lee

(10) Patent No.: US 6,882,492 B1
(45) Date of Patent: Apr. 19, 2005

(54) CASSETTE TYPE AUDIO DATA OR SIGNAL RECORDING AND REPRODUCING APPARATUS

(76) Inventor: Do-yeal Lee, 1001 10th Floor Jeongwon Bldg. Yeoido-dong, Youngdeungpo-gu (KR)

( * ) Notice: Subject to any disclaimer, the term of this patent is extended or adjusted under 35 U.S.C. 154(b) by 0 days.

(21) Appl. No.: 09/869,172

(22) PCT Filed: Dec. 23, 1999

(86) PCT No.: PCT/KR99/00809
§ 371 (c)(1),
(2), (4) Date: Sep. 27, 2001

(87) PCT Pub. No.: WO00/39798
PCT Pub. Date: Jul. 6, 2000

(30) Foreign Application Priority Data

Dec. 29, 1998 (KR) .......................................... 98-60010
Jul. 6, 1999 (KR) .......................................... 99-27047

(51) Int. Cl.[7] .......................... G11B 15/18; G11B 17/00; G11B 19/02
(52) U.S. Cl. .......................................... 360/69; 360/62
(58) Field of Search .............................. 360/132, 134, 360/137, 62, 69; 369/2, 5, 6, 7; 700/94

(56) References Cited

U.S. PATENT DOCUMENTS

| | | | | |
|---|---|---|---|---|
| 5,055,947 A | * | 10/1991 | Satoh | 360/62 |
| 5,159,182 A | * | 10/1992 | Eisele | 235/492 |
| 5,243,485 A | * | 9/1993 | Weiley | 360/132 |
| 5,291,346 A |   | 3/1994 | Baegaard | |
| 5,654,942 A | * | 8/1997 | Akahane | 369/2 |
| 5,790,423 A | * | 8/1998 | Lau et al. | 700/94 |
| 6,061,306 A | * | 5/2000 | Buchheim | 369/2 |
| 6,089,459 A | * | 7/2000 | Eisele et al. | 235/492 |
| 6,243,686 B1 | * | 6/2001 | McPherson et al. | 704/500 |
| 6,301,513 B1 | * | 10/2001 | Divon et al. | 700/94 |
| 6,327,633 B1 | * | 12/2001 | Chawla et al. | 710/62 |

* cited by examiner

*Primary Examiner*—David Hudspeth
*Assistant Examiner*—Jason Olson
(74) *Attorney, Agent, or Firm*—Nixon & Vanderhye, P.C.; Frank P. Presta

(57) ABSTRACT

A cassette type audio signal recording apparatus comprising a recording detection sensor for generating a predetermined detection output as a recording button is pressed, a recording head for converting the applied magnetic signal to an electric audio signal and outputting the converted signal, an A/D converter for converting the audio signal output from the recording head to a digital signal, a memory for recording digital type audio data, a recording controller for controlling the encoding of the digital data converted by the A/D converter based on the detection output generated by the recording detection sensor and for storing the encoded data in the memory, and a power supply portion for supplying power to each of the components, wherein the outer shape thereof has the same size and shape as that of a cassette tape.

6 Claims, 7 Drawing Sheets

CASSETTE TYPE AUDIO DATA OR SIGNAL RECORDING AND REPRODUCING APPARATUS

TECHNICAL FIELD

The present invention relates to an apparatus for recording and reproducing audio signals, and more particularly to a cassette type apparatus for recording and reproducing digital audio data or general analog signals.

BACKGROUND ART

MP3 is one of several audio parts in the MPEG technology. MP3 is an audio file format with the file extension name of MP3 made using an audio data coding technology and has the capacity of compressing existing data by about 1/12 without noticeable loss of sound quality. Accordingly, it is suitable for transmitting and receiving an audio file using a limited transmission line.

In general, an MP3 file can be heard by inserting an earphone into an MP3 player such as that shown in FIG. 1. In FIG. 1, reference numeral 10 denote function buttons for play, rewind and record; reference numeral 12 denotes an LCD display panel for displaying the status such as play or rewind; and reference numeral 14 denotes an earphone jack.

In the MP3 player shown in FIG. 1, MP3-coded music can be reproduced by inserting an earphone into the earphone jack 14 and pressing the play button.

However, to listen to the MP3 music through an audio cassette player without an earphone, a cassette tape for an audio cassette tape interface is connected to the earphone jack 14 of the MP3 player and the cassette tape is inserted into an audio cassette deck, as shown in FIG. 2. The cassette tape of FIG. 2 has a structure in which audio signals are magnetized by a head (not shown) and the magnetized audio signals are applied to a head of the audio cassette deck. The audio cassette deck converts the input magnetized signals to electric audio signals and outputs the converted signals to speakers.

However, such method is inconvenient in that the above additional cassette tape for interfacing is needed to listen to MP3 music through an audio cassette player. Thus, an apparatus which enables listening of various digital audio data including MP3 music through an audio cassette player such as a car audio cassette player is needed.

DISCLOSURE OF THE INVENTION

To satisfy the above needs, it is an object of the present invention to provide a cassette type apparatus for recording and reproducing digital audio data which has the same size and shape as an audio cassette tape and can reproduce digital audio data or record digital audio data downloaded from an external source.

It is another object of the present invention to provide a cassette type apparatus for recording digital audio data which has the same size and shape as an audio cassette tape and can record a general analog audio signal applied from an audio cassette player based on a detection output of a recording detection sensor.

It is yet another object of the present invention to provide a cassette type apparatus for reproducing digital audio data which has the same size and shape as an audio cassette tape and can reproduce digital audio data stored in a memory, based on a detection output of a reproduction detection sensor, to be played by an audio cassette player.

To achieve the above object, there is provided a cassette type digital audio data recording and reproducing apparatus which comprises a speed and direction detection sensor for detecting the speed and direction of a winding reel or rewinding reel and generating a detection output corresponding to the speed and direction, a memory where a digital audio file is recorded or stored, a controller for controlling the reading and decoding of the digital audio file stored in the memory, or the recording of the digital audio file, based on the detection output generated from the speed and direction detection sensor, a D/A converter for converting a digital audio file decoded by the controller to an analog audio file, a head for converting the audio signal converted by the D/A converter to a magnetic signal, and a power supply portion for supplying power to each of the blocks, wherein the outer shape thereof has the same size and shape a cassette tape.

To achieve another object, there is provided a cassette type audio signal recording apparatus which comprises a recording detection sensor for generating a predetermined detection output as a recording button is pressed, a recording head for converting the applied magnetic signal to an electric audio signal and outputting the converted signal, an A/D converter for converting the audio signal output from the recording head to a digital signal, a memory for recording digital type audio data, a recording controller for controlling the encoding of the digital data converted by the A/D converter based on the detection output generated by the recording detection sensor and the storing the encoded data in the memory, and a power supply portion for supplying power to each of the blocks, wherein the outer shape thereof has the same size and shape as those of a cassette tape.

To achieve yet another object, there is provided a cassette type audio signal reproducing apparatus which comprises a reproduction detection sensor for generating a predetermined detection output as a reproducing button is pressed, a memory for storing digital type audio data, a reproducing controller for controlling the reading of the audio data stored in the memory based on the detection output generated by the reproduction detection sensor and decoding the read data, a D/A converter for converting the audio data decoded by the reproducing controller to an analog signal, a reproducing head for converting the analog signal converted by the D/A converter to a magnetic signal and outputting the converted signal, and a power supply portion for supplying power to each of the blocks, wherein the outer shape thereof has the same size and shape as a cassette tape.

BEST MODE FOR CARRYING OUT THE INVENTION

Figure 1:
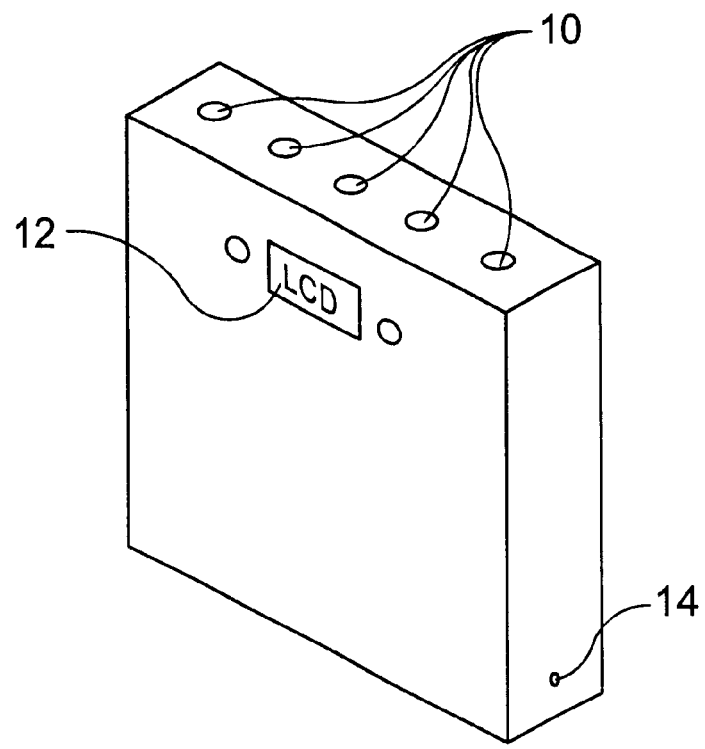
FIG. 1 is a view illustrating a typical portable MP3 player.
Figure 2:
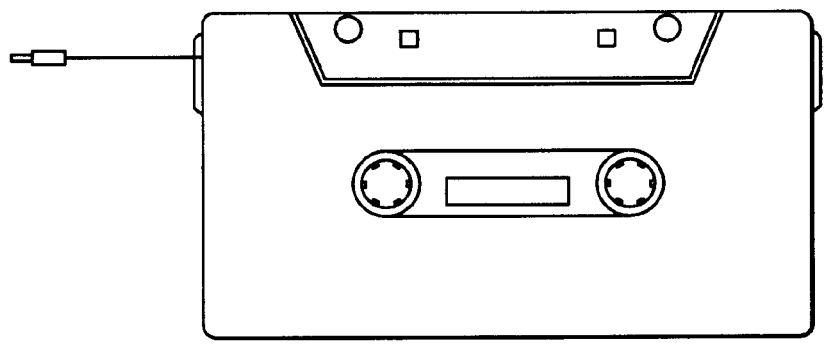
FIG. 2 is a view illustrating a tape for an audio cassette interface enabling reproduction of MP3 music stored in the player of FIG. 1 from an audio cassette player.
Figure 3:
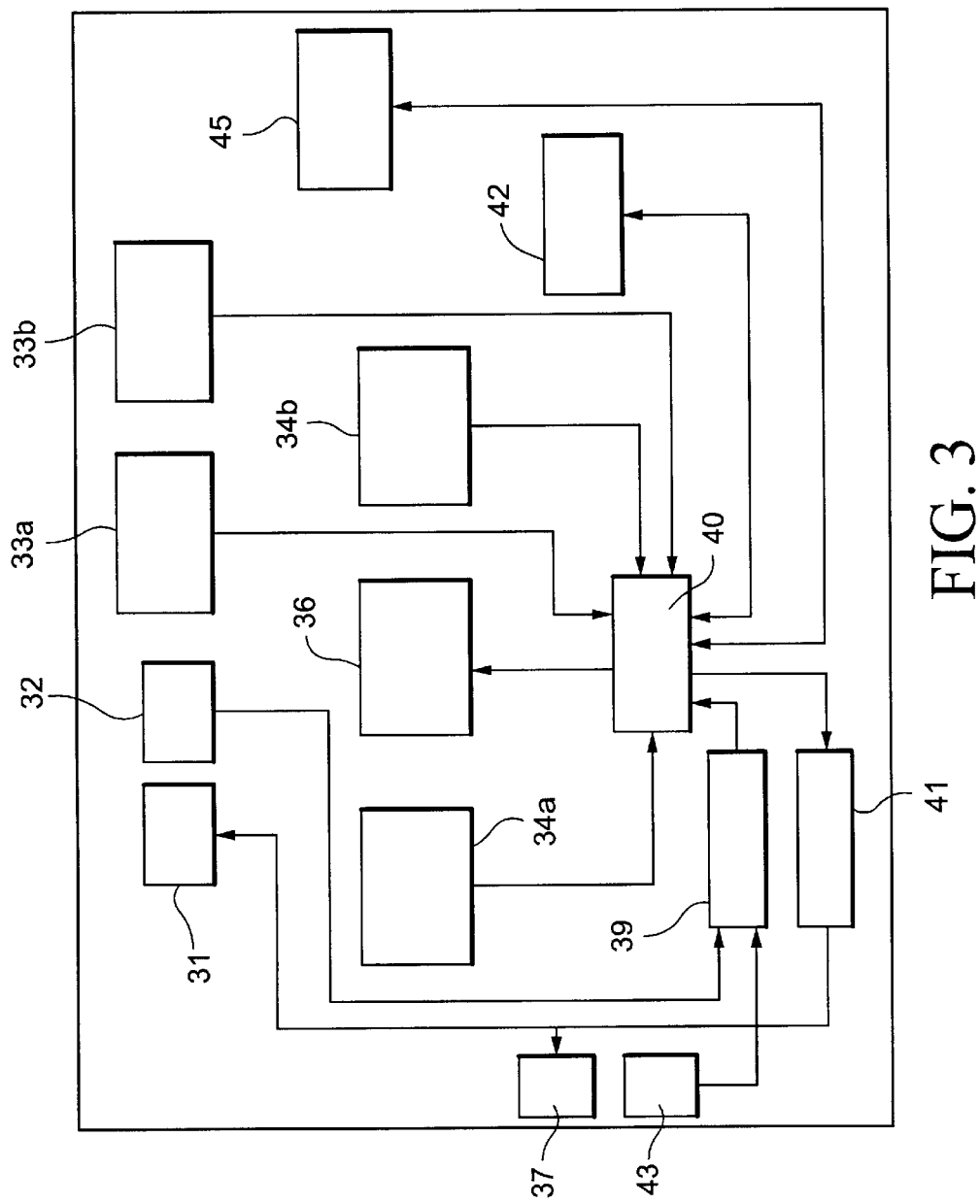
FIG. 3 is an internal block diagram of a cassette type apparatus for recording and reproducing digital audio data or signals according to the present invention.

FIG. 3 is an internal block diagram of a cassette type apparatus for recording and reproducing digital audio data or signals according to the present invention. The apparatus shown in FIG. 3 includes a play head 31, a recording head 32, a play detection sensor 33a, a play/FF (fast forward) speed sensor 34a, a recording detection sensor 33b, a display 36, a speaker 37, a REW (rewinding) speed sensor 34b, an analog-to0digital A/D converter 39, a controller 40, a digital-to-analog D/A converter 41, a memory 42, a microphone 43, and an external device I/F (interface 45.

Figure 4A:
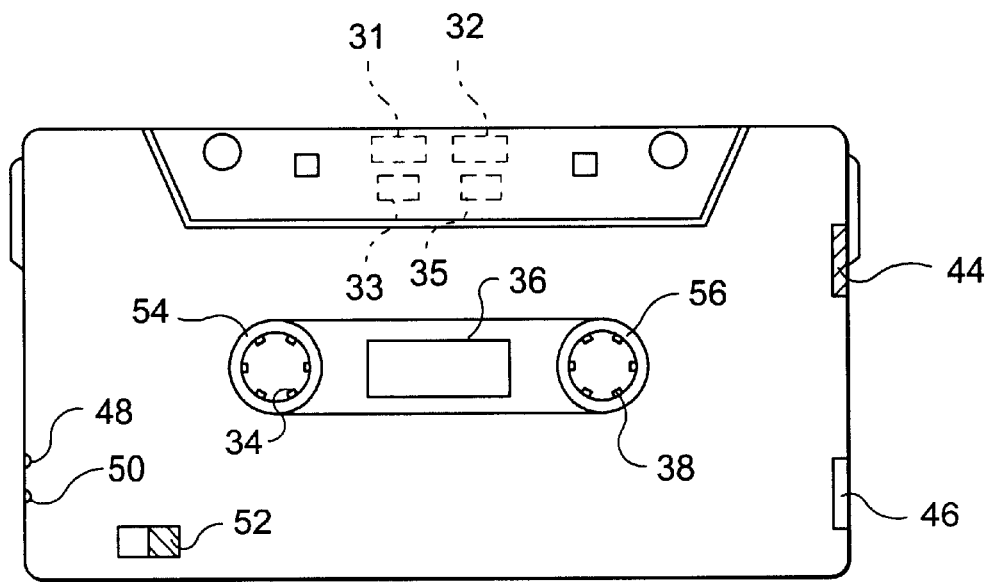
FIG. 4A is a view illustrating a cassette type apparatus for recording and reproducing digital audio data or signals including the apparatus of FIG. 3.
Figure 4B:
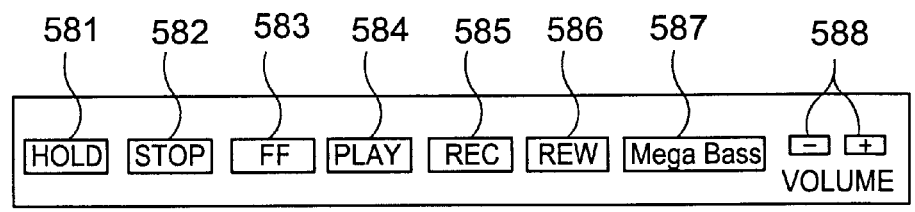
FIG. 4B is a view illustrating various function keys disposed at the bottom surface of the apparatus shown in FIG. 4A.

Also, FIG. 4A illustrates a cassette type apparatus for recording and reproducing digital audio data or signals including the apparatus of FIG. 3. FIG. 4B illustrates various function keys disposed at the bottom surface of the apparatus shown in FIG. 4A.

In FIGS. 4A and 4B, reference numeral 44 denotes an external data input/output device 44, reference numeral 46 denotes a battery insertion opening, reference numeral 48 denotes a microphone jack; reference numeral 50 denotes an earphone jack; reference numeral 52 denotes a write-protect tab, reference numeral 54 denotes a winding reel; reference numeral 56 denotes a rewinding reel; reference numeral 581 denotes a hold key; reference numeral 582 denotes a stop key; reference numeral 583 denotes a FF key; reference numeral 584 denotes a play key; reference numeral 585 denotes a REC (recording key; reference numeral 586 denotes a REW key; reference numeral 587 denotes a Mega Bass key for enhancing bass sound; and reference numeral 588 denotes volume control keys. The same blocks as those of FIG. 3 are denoted by the same reference numeral. Here, the reference numerals 31, 32, 33a and 33b, indicated by dotted lines in FIG. 4A, denote invisible blocks from the outside of the present apparatus, that is, blocks installed inside the apparatus.

During reproduction, the play head 31 converts audio signals (general analog audio signals) converted at the D/A converter 41 to magnetic signals. The converted magnetic signals are applied to a head of an audio cassette player into which the present apparatus is inserted and the sound is output through speakers of the audio cassette player. During recording, the recording head 32 converts magnetic signals applied from the head of the audio cassette player where the present invention is inserted to electric audio signals, and the converted signals are applied to the A/D converter 39.

The play detection sensor 33a generates a predetermined detection output as a play button is pressed and applies the detection output to the controller 40. Here, the play button indicates not the PLAY key 584 attached to the present apparatus, but the play button of a car audio cassette where the present apparatus is inserted. The play detection sensor 33a is preferably installed at a play deck (not shown) where the play button is pressed when the present apparatus is inserted into the audio cassette player.

The play/FF speed sensor 34a detects the speed of the winding reel 54 and generates a detection output corresponding to the detected speed. During play and FF modes, only the winding reel 54 rotates. Also, the speed of the winding reel 54 in the FF mode is faster than that of the play mode. The play/FF speed sensor 34a generates the detection output according to the speed, for example, a voltage or current. The play/FF speed sensor 34a is preferably installed at the winding reel 54.

The recording detection sensor 33b generates a predetermined detection output as a record button is pressed and applies the generated detection output to the controller 40. Here, the recording button does not indicate the REC key 585 attached to the present apparatus, but a record button of a car audio cassette where the present apparatus is inserted. The recording detection sensor 33b is preferably installed at a recording deck (not shown) where the record button is pressed when the present apparatus is inserted into the audio cassette player.

The REW speed sensor 34b detects the speed of the rewinding reel 56 and generates a detection output corresponding to the detected speed. During a REW mode, only the rewinding reel 56 rotates. Like the play/FF speed sensor 34a, the REW speed sensor 34b generates a detection output according to the speed of the rewinding reel 56, for example, a voltage or current. The REW speed sensor 34b is preferably installed at the rewinding reel 54.

The A/D converter 39 converts general analog audio signals output from the recording head 32 to digital audio data and outputs the converted data to the controller 40. Also, the A/D converter 39 converts general analog audio signals input through the microphone 43 into digital data and outputs the converted data.

The D/A converter 41 converts digital audio data decoded by the controller 40 into analog audio signals and applies the converted signals to the play head 31. The audio signals can be output to the speaker 37.

The memory 42 stores digital audio data such as AAC and MSAudio, including an MP3 music file. Also, the memory 42 stores audio data output from an audio cassette player having a record function and converted by the A/D converter 39 into digital data and audio data encoded by the controller 40. The memory 42 stores data input from another PC via the external device I/F 45 under the control of the controller 40.

An MP3 music file can be received though the external input/output device 44 and the external device I/F 45. There are many web sites providing MP3 music files or other materials in MP3 format for a fee or for free. Thus, when a user downloads an MP3 music file or digital audio file through a computer and stores the downloaded music in the memory 42 through the external input/output device 44 and the external I/F 45, he/she can listen to the stored MP3 music file or digital audio file anytime while carrying a portable MP3 player. Also, if the user listening to general analog audio signals output from an audio cassette wishes to record the signals, by pressing the record button, the signals are stored in the memory 42 through the above steps. General, recorded audio signals can always be played through the audio cassette player.

The operation of the controller 40 will be described according to the a case in which the present apparatus is operated by a digital audio data recording and reproducing apparatus, and according to another case in which the present apparatus is operated by a general analog audio signal recording and reproducing apparatus.

First, in the case in which the present apparatus is operated by a digital audio data recording and reproducing apparatus, the controller 40 detects the detection output generated from the play/FF speed sensor 34 or the REW speed sensor 34b, and reads and decodes the digital audio data stored in the memory 42 to output the decoded data to the D/A converter 41. That is, the controller 40 detects whether the values detected by the speed sensors 34a and 34b are for a play, an FF or a REW function; and controls reading and decoding of the music file stored in the memory 42 according to the detected value, or performing the operations of fast forwarding or rewinding.

In the case in which the present apparatus is operated by a general analog audio signals recording and reproducing apparatus, when analog audio signals are reproduced, the controller 40 controls encoding of the digital data converted by the A/D converter 39 based on the detection output generated from the recording detection sensor 33b and storing the encoded data in the memory 42.

When the analog audio signals are reproduced, the controller 40 reads and decodes the audio data stored in the memory 42 based on the detection output generated from the reproduction detection sensor 33a and outputs the decoded data to the D/A converter 41.

According to the cassette tape type digital audio data or signal recording and reproducing apparatus according to a preferred embodiment of the present invention, MP3 music can be enjoyed through the earphone jack 50 as in the existing digital audio data or signal recording and reproducing apparatus. In this case, as the winding reel 54 or rewinding reel 56 does not rotate, the controller 40 performs the reproduction of an MP3 music file substantially in the same manner as in the typical digital audio data recording and reproducing apparatus according to the inputs of the various function keys 58–70.

The display 36 can be represented by an LCD, for example, and displays the states of playing, rewinding and fast forwarding.

The external data input/output device 44 receives a digital audio file through a computer. The write-protect tab 52 is a switch for allowing recording or not allowing recording.

FIG. 4B shows various function keys, which are preferable disposed at the bottom surface of the apparatus shown in FIG. 4A. In the case of using the digital audio data or signal recording and reproducing apparatus according to a preferred embodiment of the present invention by inserting the same into a cassette player of a car, as the present apparatus is operated by the key of the cassette player, it can be said that the function keys shown in FIG. 4B may not be needed.

Figure 5:
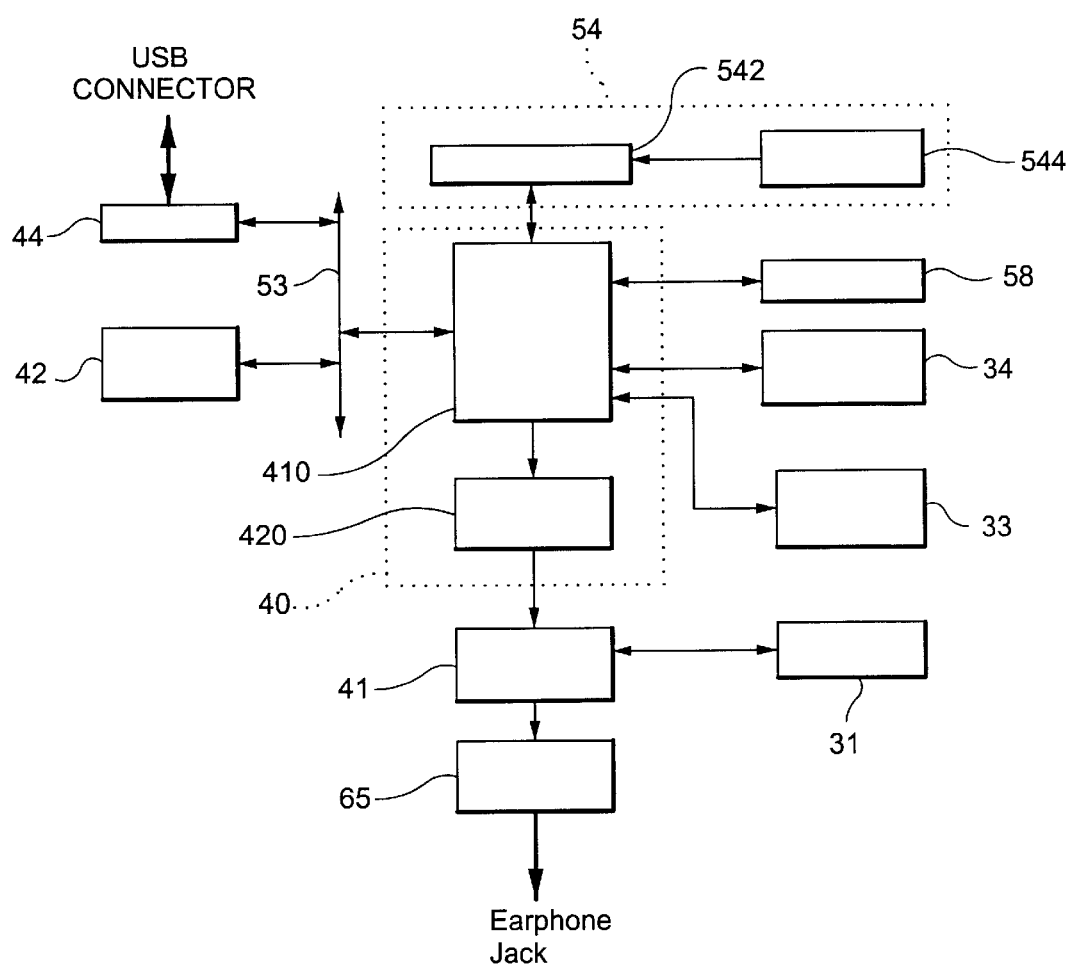
FIG. 5 is a block diagram of a cassette type apparatus for recording and reproducing digital audio data or signals according to another preferred embodiment of the present invention.

FIG. 5 is a block diagram of a cassette type apparatus for recording and reproducing digital audio data or signal according to another preferred embodiment of the present invention. In the apparatus shown in FIG. 5, reference numeral 53 denotes a bus: reference numeral 54 denotes a power supply portion, and reference numeral 40 denotes a controller.

As the overall configuration and operation of the apparatus shown in FIG. 5 is the same as that of the apparatus shown in FIG. 3, the operations of downloading a digital audio music file from a PC and reproducing the downloaded music file by a cassette player will be mainly described.

First, in the operation of downloading a digital music file from a PC, packets of a file received by a PC connecting portion 51 appropriate for the corresponding protocol through a USB (universal serial bus) cable are stored in a flash memory 42 under the control of a microprocessor 10. The PC connection portion 44 can be represented as a parallel connector. Here, the above downloading is performed through a parallel cable. Although a flash memory 42 is used as the memory in FIG. 5, a detachable memory such as Smartmedia or MMC (multimedia memory card) can be used. If one has many detachable memories, it is possible to easily listen many digital audio files by changing the memory media.

Figure 8:
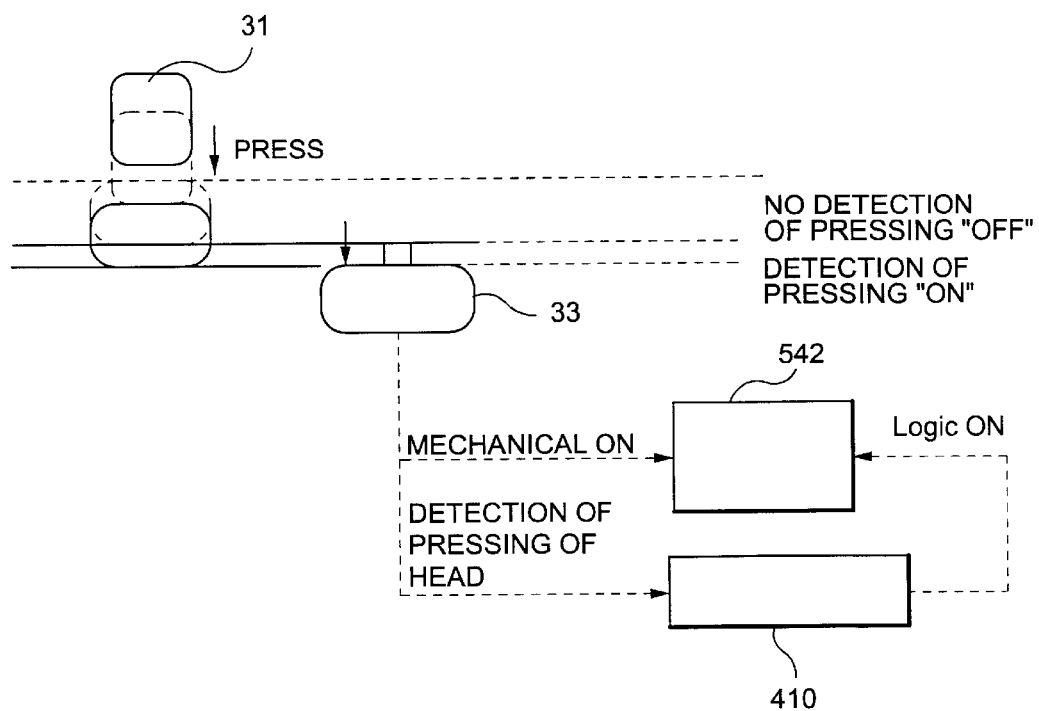
FIG. 8 is a view for explaining the operation of the head pressing detection sensor.

In the operation of a case in which the apparatus of FIG. 5 performs reproduction by being inserted into a cassette player of a car, first, when the apparatus of FIG. 5 is inserted, a head pressing detection sensor 33 detects pressing of a cassette player head 31, as shown in FIG. 8. When the pressing is detected, the power supply portion 54 is turned on and power is supplied to each block. That is, DC power supplied from a battery portion 20 is converted by a DC/DC converter 542 to power suitable for a portable apparatus and supplied to each block. The battery portion 544 may use a Ni—MH (nickel metalhide) cell, a nickel cadmium cell or a lithium cell. When the power of 1.2V is supplied from the battery portion 544, the DC/DC converter 542 converts the power to 3V. Also, the microprocessor 10 is ready to detect the pressing of the head to perform necessary functions.

When the apparatus of FIG. 5 is inserted into the cassette deck, the rotation speed and direction of a reel rotating motor (not shown) of a cassette is detected by the speed and direction detection sensor 34. Then, the microprocessor 562410 reads a digital audio file through a bus 53 from a flash memory 42 based on the speed and direction. That is, when the speed and direction is identified, a corresponding file is searched for and ready by performing a corresponding action such as moving to the next or previous song, fast forwarding from the current song, or fast rewinding. As audio data is stored in the flash memory 42 in a compressed state, a decoding portion 20 decompresses the read file and transfers it to the D/A converter 41. The D/A converter 41 converts a digital music file into analog signals to apply the converted signals to a transmission head portion 31. The signals output from the transmission head portion 31 are transmitted to a head of the cassette player where the present apparatus is inserted. Finally, a user can hear the music through speakers.

When the present apparatus is not inserted into a cassette player and is independently reproduced, the present apparatus is operated by pressing the play key to be turned on. Here, the microprocessor 10 detects functions such as Play, Stop, FF, REW, Hold and Mega Bass input through and controls the action of the corresponding key. Accordingly, the music data read from the flash memory 42 and decoded is converted by the D/A converter 41 into analog signals and amplified by an amplification portion 65. Finally, a user can hear the music through an earphone jack.

Figure 6:
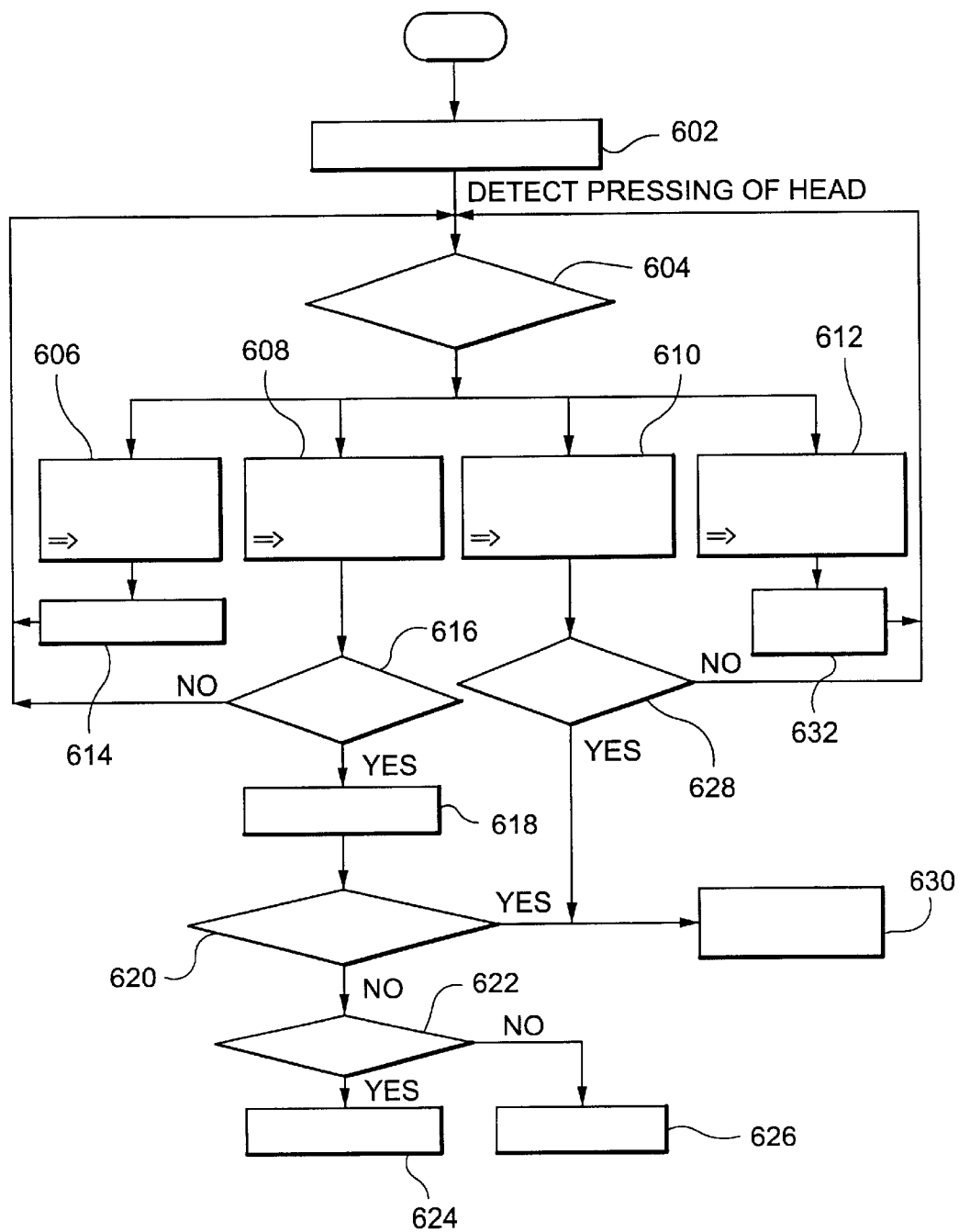
FIG. 6 a flow chart for explaining the operation the microprocessor 10 when the apparatus of FIG. 5 is inserted into a cassette player.

FIG. 6 is a flow chart for explaining the operation of the microprocessor 10 when the apparatus of FIG. 5 is inserted into a cassette player.

In FIG. 5, the processor 10 is in a power off mode before being inserted into a car cassette deck (step 602). Then, whether the head is pressed or the motor of the cassette player is rotated is determined (step 604). Precisely, the rotation of the motor is a determination of rotation of a reel of the present apparatus. The operation when the header is pressed or the motor is rotated can be divided into four cases as follows.

First, when it is determined that the head is pressed and the motor rotates at a constant speed, the present apparatus operates in a play mode (steps 606 and 614). That is, at this stage, the microprocessor 10 reproduces a digital music file from the flash memory 42 at a normal speed.

Next, when it is determined that the head is pressed but the motor does not rotate, the present apparatus operates in a stop mode (step 608).

In the stop mode, it is determined whether a predetermined time for example, 30 seconds, has passed (step 616). If the predetermined time has not passed, step 604 for determining whether the motor rotates is performed. Otherwise, a sleep mode which is a power saving mode is performed (step 618). In the sleep mode, in which the power consumption of the battery portion 544 is minimized, it is determined whether the motor rotates and, if the motor rotates, the apparatus enters the play mode. This is useful particularly for preventing the battery portion 544 from being discharged when the present apparatus is inserted into the cassette deck (here, the head is pressed and the power is applied) in a state in which a user turns off the cassette player of a car.

It is determined whether the pressing of head is released (step 620). If it is released, power cut mode is performed (step 630). Otherwise, it is determined whether the motor is rotated (step 622) and, if the motor rotates, the play mode is performed (step 624). If the motor does not rotate, the stop mode is performed (step 626).

When the pressing of the head is released and the motor does not rotate, the play mode is performed (step 610). The case means when the head is pressed and the pressing of head is released.

Here, it is determined whether a predetermined time, for example, 30 seconds, has passed is determined (step 628). If the predetermined time has not passed, step 604 for determining whether the head is pressed or the motor rotates is performed. If the predetermined time has passed, the pressing of head is released.

Here, it is determined whether the predetermined time, for example, 30 seconds, has passed (step 628). If the predetermined time has not passed, step 604 for determining whether the head is pressed or the motor rotates is performed. If the predetermined time has passed, the power cut mode is performed (step 630).

Figure 7A:
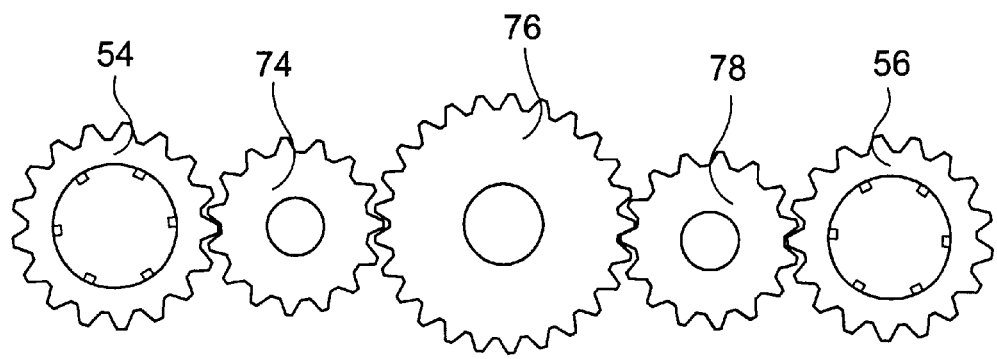
FIGS. 7A and 7B are views respectively illustrating an example representing the speed and direction detection sensor 60.
Figure 7B:
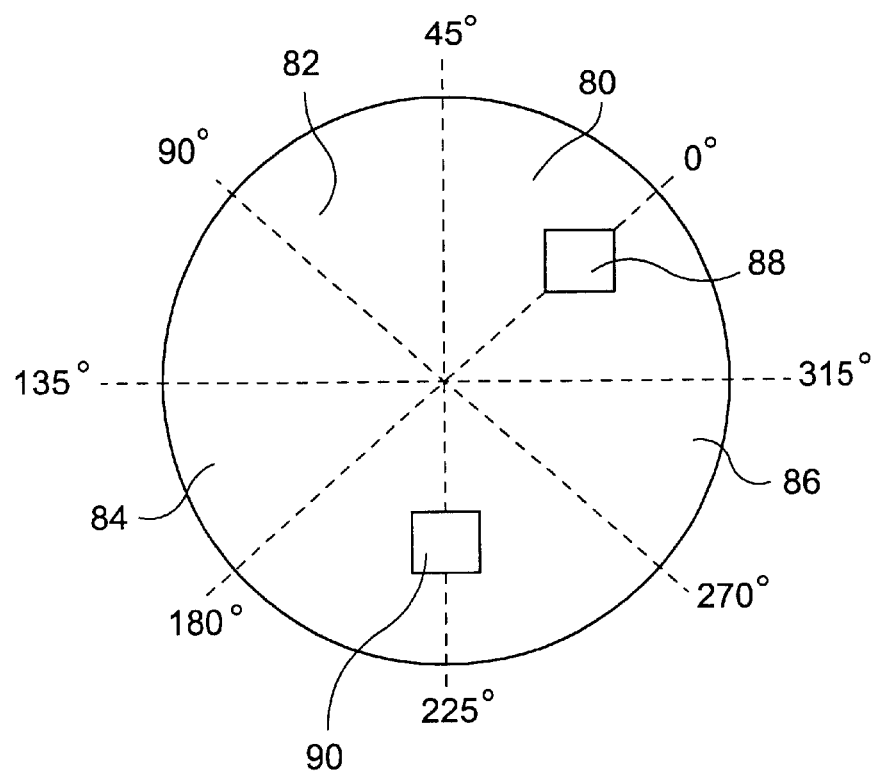

FIGS. 7A and 7B are views illustrating an example of the speed and direction detection sensor 60 shown in FIG. 5. In FIG. 7A, reference numerals 54 and 56 denote a winding reel and a rewinding reel, respectively, and reference numerals 74, 76 78 denote circular gears. The winding real 7054 and the rewinding reel 7256 are mechanically connected via the circular gears 74, 76, 78. Preferably, there is an odd number of circular gears such that the winding real 54 and the rewinding reel 56 can rotate in the same direction.

FIG. 7B shows the outer appearance of one of the three circular gears shown in FIG. 7A. The circular gear of FIG. 7B is divided into four quadrants 90° each. The area between 315°–45° is the first quadrant; the area between 45°–135° is the second quadrant; the area between 135°–225° is the third quadrant; and the area between 225°–315° is the forth quadrant. Here, the first and third quadrants 80 and 84 are colored white and the second and fourth quadrants 82 and 86 are colored black. A first light emitting/receiving sensor Sa 88 is installed above the central portion of the first quadrant 80 (above the position of 0°), and a second light emitting/receiving sensor Sb 90 is installed above the boundary position between the third and fourth quadrants 84 and 86 (above the position of 225°). Of course, the first light emitting/receiving sensor Sa 88 can be installed above the central portion of the third quadrant (above the position of 180°). In this case, the second light emitting/receiving sensor Sb 90 is installed above the boundary position between the first and second quadrants 80 and 82 (above the position of 45°).

The first and second light emitting/receiving sensors 88 and 90 are installed at the upper surface of the circular gear of FIG. 7B. The light emitting sensor emits light to the circular gear and the light receiving sensor detects the light reflected from the circular gear to generate a high or low logic signal. That is, as the second and fourth quadrants 82 and 86 of black color absorb a large amount of light emitted from the light emitting sensor, the amount of light absorbed by the light receiving sensor is small and the first or second light emitting/receiving sensor 88 or 90 generates a "low" logic signal. Contrarily, as a large amount of light emitted from the light emitting sensor is reflected by the first and third quadrants 80 and 84 of white color, the amount of light absorbed by the light receiving sensor is great and the first or second light emitting/receiving sensor 88 or 90 generates a "high" logic signal.

When the microprocessor 10 reads the amount of light received by the light receiving sensor, at intervals of 45°, signals are obtained as shown in Table 1.

TABLE 1

|  |  | 0 | 45 | 90 | 135 | 180 | 225 | 270 | 315 | 360 |
|---|---|---|---|---|---|---|---|---|---|---|
| Forward | A | L | H | H | L | L | H | H | L |  |
|  | B | L | L | H | H | L | L | H | H |  |
| Reverse | A | L | H | H | L | L | H | H | L |  |
|  | B | H | H | L | L | H | H | L | L |  |

With respect to the first light emitting/receiving sensor 88, assuming a start point, when the signal of the first light emitting/receiving sensor 88 is shifted from "L" to "H", the signal of the second light emitting/receiving sensor 90 is determined. If the signal is "L", it is determined to be a forward direction. If the signal is "H", it is determined to be a reverse direction.

As to the speed, the time during which the change of a signal waveform ("L"-"H"-"L"-"H") generated from the first light emitting/receiving sensor 88 continues is memorized, and when the speed is several times faster than the memorized time, it is determined to be FF or REW and a corresponding action is performed. In FIG. 7B, the color of the circular gear is not necessarily black or white and any colors having different reflection factors can be used. Also, the position where the light emitting/receiving sensor is installed can be installed at an appropriate position different from FIG. 7B as long as the speed and direction can be detected in the same manner as Table 1.

Although not shown, the apparatus of FIG. 3 or FIG. 5 may include a radio function such as an FM or AM radio. Then, the digital audio data or signal recording and reproducing apparatus according to the present invention can perform an MP3 player function, a general voice recording and reproducing function and a radio function.

It is noted that the present invention is not limited to the preferred embodiment described above, and it is apparent that variations and modifications by those skilled in the art can be effected within the spirit and scope of the present invention. Although MP3, AAC and MSAudio are described as examples of digital audio data in the preferred embodiment of the present invention, any digital audio data format adopted as a standard by other standard organizations can be substantially adopted. Thus, the scope of right will be determined according to the scope of the claims described later, not to be within the scope of the above detailed description.

As described above, the apparatus according to the present invention has the same size and shape as an audio cassette tape and a digital audio file such as MP3, AAC and MSAudio can be reproduced corresponding to the speed of winding the tape. Thus, the digital audio data can be heard in a cassette player of a car by manipulating the cassette player without an additional cassette tape for interfacing.

Also, the same functions of the existing digital audio data or signals recording and reproducing apparatus can be performed. A general audio signal can be recorded and stored by inserting the present invention into an audio cassette player having a recording deck. Further. the stored audio signal can be reproduced and heard through the cassette player.

Industrial Applicability

The cassette tape type audio data or signals recording and reproducing apparatus according to the present invention can be applied to an MP3 player which is now garnering much attention.

What is claimed is:

1. A cassette type digital audio data recording and reproducing apparatus comprising:

a speed and direction detection sensor for detecting the speed and direction of a winding reel or rewinding reel and generating a detection output corresponding to the speed and direction;

a memory where a digital audio file is recorded or stored;

a controller for controlling the reading and decoding of the digital audio file stored in the memory, or the recording of the digital audio file, based on the detection output generated from the speed and direction detection sensor;

a D/A converter for converting a digital audio file decoded by the controller to an analog audio file;

a head for converting the audio signal converted by the D/A converter to a magnetic signal;

a head pressing detection sensor for detecting the pressing of the head and supplying a detection output signal to the controller; and a power supply portion having a battery for supplying DC power and a DC-to-DC converter for converting DC power supplied from the battery to a predetermined DC power and outputting the converted power when the detection output signal of the head pressing detection sensor is supplied to the controller, wherein after the power is supplied from the DC-to-DC converter, the controller checks whether the winding reel or the rewinding reel rotates and is shifted to a power saving mode for minimizing power consumption of the battery if the above reels do not rotate after a predetermined time passes.

2. The apparatus of claim 1, wherein the speed and direction detection sensor comprises odd-numbered circular gears installed between the winding reel and the rewinding reel and connecting the two reels mechanically, inside structure of one of the odd-numbered circular gears being divided into four quadrants of 90° each, wherein the facing two quadrants are a first color and the other two quadrants are a second color having a different light reflection factor from the first color, the speed and direction detection sensor comprising a first light emitting/receiving sensor which is installed above central position between the two quadrants having the first color and a second light emitting/receiving sensor which is separated more than 90° from the position of the first light emitting/receiving sensor and disposed on the boundary position between the two quadrants having the second color and the two quadrants having the first color, so that the first and second light emitting/receiving sensors check a detection output according to the amount of light emitted to the circular gear and reflected therefrom, at intervals of 45° and at the period of 180° and an electric signal is generated as a speed and direction detection output.

3. The apparatus of claim 2, further comprising an external data input/output device receiving the digital audio file in units of a packet suitable for corresponding protocol from an external source through a USB (universal serial bus) cable or a parallel cable, wherein the controller records the digital audio file received from the external data input/output device in the memory.

4. The apparatus of claim 3, further comprising a display portion for displaying the state of various operations including the recording or reproducing of the digital audio file, wherein audio files including a audio file in an MPEG format, AAC and MSAudio which is adopted as a standard by a standard organization can be recorded or reproduced.

5. A cassette type audio signal recording apparatus having an outer shape and comprising:

a recording detection sensor for generating a predetermined detection output as a recording button is pressed;

a recording head for converting the applied magnetic signal to an electric audio signal and outputting the converted signal;

an A/D converter for converting the audio signal output from the recording head to a digital signal;

a memory for recording digital type audio data;

a recording controller for controlling the encoding of the digital data converted by the A/D converter based on the detection output generated by the recording detection sensor and the storing of the encoded data in the memory; and a power supply portion for supplying power to recording detection sensor, the recording head, the A/D converter, the memory and the recording controller, wherein the outer shape thereof has the same size and shape as that of a cassette.

6. A cassette type audio signal reproducing and recording apparatus comprising:

a reproduction detection sensor for generating a predetermined detection output as a reproducing button of a cassette tape player is pressed;

a speed and direction detection sensor for detecting the speed and direction of a winding reel or rewinding reel and generating a detection output corresponding to the speed and direction;

a recording detection sensor for generating a predetermined detection output as a recording button of the cassette tape player is pressed;

a recording head for converting the magnetic signal supplied by the head of the cassette tape player to an electric audio signal and outputting the converted signal;

an A/D converter for converting the audio signal output from the recording head to a digital signal;

a memory for storing digital type audio data;

a controller for controlling the reading of the audio data stored in the memory based on the detection output generated by the speed and direction detection sensor when the detection output generated by the reproduction detection sensor is applied, and controlling the encoding of the digital data converted by the A/D converter and the storing of the encoded data in the memory when the detection output generated by the recording detection sensor is applied, a D/A converter for converting the audio data decoded by the controller to an analog signal;

a reproducing head for converting the analog signal converted by the D/A converter to a magnetic signal and outputting the converted signal; and a power supply portion having a battery for supplying DC power and a DC-to-DC converter for converting DC power supplied from the battery to a predetermined DC power and outputting the converted power when either of the detection output signals of the reproduction detection sensor and the recording detection sensor is supplied to the controller.

* * * * *